US011222115B2

(12) United States Patent
Chen (10) Patent No.: US 11,222,115 B2
(45) Date of Patent: Jan. 11, 2022

(54) DATA SCAN SYSTEM

(71) Applicant: AhP-Tech Inc., New Taipei (TW)

(72) Inventor: Chao-Huang Chen, New Taipei (TW)

(73) Assignee: AHP-TECH INC., Taipei (TW)

( * ) Notice: Subject to any disclaimer, the term of this patent is extended or adjusted under 35 U.S.C. 154(b) by 210 days.

(21) Appl. No.: 16/679,403

(22) Filed: Nov. 11, 2019

(65) Prior Publication Data

US 2021/0097183 A1 Apr. 1, 2021

(30) Foreign Application Priority Data

Sep. 26, 2019 (TW) ................................ 108134782

(51) Int. Cl.
*G06F 21/00* (2013.01)
*G06F 21/56* (2013.01)
*H04L 29/06* (2006.01)
*G06F 21/60* (2013.01)
*G06N 3/08* (2006.01)
*G06F 21/88* (2013.01)
*G06N 3/04* (2006.01)
(Continued)

(52) U.S. Cl.
CPC ........ *G06F 21/567* (2013.01); *G06F 11/1451* (2013.01); *G06F 16/2219* (2019.01); *G06F 21/568* (2013.01); *G06F 21/602* (2013.01); *G06F 21/88* (2013.01); *G06N 3/04* (2013.01); *G06N 3/08* (2013.01); *H04L 1/08* (2013.01); *H04L 41/0813* (2013.01); *H04L 43/08* (2013.01); *H04L 63/1425* (2013.01); *G06F 17/14* (2013.01); *G06F 2201/80* (2013.01); *G06F 2221/033* (2013.01); *G06F 2221/2143* (2013.01)

(58) Field of Classification Search
CPC ............... G06F 21/567; G06F 16/2219; G06F 11/1451; G06F 21/568; G06F 21/602; G06F 21/88; G06F 17/14; G06F 2201/80; G06F 2221/033; G06F 2221/2143; G06N 3/04; G06N 3/08; H04L 1/08; H04L 41/0813; H04L 43/08; H04L 63/1425
See application file for complete search history.

(56) References Cited

U.S. PATENT DOCUMENTS 6,571,282 B1 * 5/2003 Bowman-Amuah ........................ H04L 67/303
709/219
8,218,538 B1 * 7/2012 Chidambaram .... H04L 47/6215
370/386

(Continued)

*Primary Examiner* — Hosuk Song
(74) *Attorney, Agent, or Firm* — Schmeiser, Olsen & Watts, LLP (57) ABSTRACT

A data scan system is introduced, including an electronic device including a data scan module. The data scan module includes a data capture unit and a data processing control unit. The data capture unit is used to capture a target data and assign a plurality of corresponding labels to the target data. The data processing control unit is coupled to the data capture module, and includes an exception processing sub-unit for performing an exception processing mechanism on the target data, a control status switching sub-unit, a backup sub-unit, and a remote control sub-unit, an error report sub-unit, a flow monitoring sub-unit and a shortest path handling sub-unit. It can greatly improve the degree of control over the subsequent processing of data, thereby achieving the purpose of improving the security of data transmission.

16 Claims, 8 Drawing Sheets

(51) Int. Cl.
*G06F 16/22* (2019.01)
*H04L 1/08* (2006.01)
*H04L 12/26* (2006.01)
*H04L 12/24* (2006.01)
*G06F 11/14* (2006.01)
*G06F 17/14* (2006.01)

(56) References Cited

U.S. PATENT DOCUMENTS

| | | | | |
|---|---|---|---|---|
| 9,185,125 B2 * | 11/2015 | Varsanyi | ............... | G06F 21/552 |
| 10,389,810 B2 * | 8/2019 | Swallow | ............. | H04L 67/1095 |
| 11,025,674 B2 * | 6/2021 | Crabtree | ............. | H04L 63/1425 |

* cited by examiner

DATA SCAN SYSTEM

CROSS-REFERENCE TO RELATED APPLICATION

This non-provisional application claims priority under 35 U.S.C. § 119(a) on Patent Application No(s). 108134782 filed in Taiwan, R.O.C. on Sep. 26, 2019, the entire contents of which are hereby incorporated by reference.

BACKGROUND OF THE INVENTION

1. Field of the Invention

The present disclosure relates to a data scan system, and in particular to a data scan system in which a data content can be retrieved and used for later data processing.

2. Description of the Related Art

With the rapid development of the Internet, it is full of various data sources with different information (various websites and web pages), and as the number of websites and web pages grows, the amount of data existing in the Internet also grows faster than expected, so the need for security in data transmission is also rapidly increasing.

At present, the protection providing security of data on the network mostly relies on the anti-virus software. However, the current anti-virus software compares the existence of malware or data according to certain rules. In addition, the anti-virus software triggers quarantine operations only when malwares are detected, so before the definition of the virus is updated, it can be defenseless toward malware or data that is unknown.

Thus, it is desirable to have improvements on the conventional data scan approach in order to provide better data security.

BRIEF SUMMARY OF THE INVENTION

In view of the above deficiencies of the prior art, the main object of the present invention is to provide a data scan system in which a data content can be retrieved and used for later data processing. It can greatly improve the control of subsequent data processing, thereby improving the security of data transmission.

To achieve at least the above objective, the present disclosure provides a data scan system comprising:

an electronic device, comprising a data scan module, wherein the data scan module comprises:

a data capture unit, for capturing a target data, assigning a plurality corresponding labels to the target data; and a data processing control unit, linked with the data capturing module, wherein the data processing control unit comprises:

an exception processing sub-unit, for performing an exception processing mechanism on the target data according to the labels of the target data;

a control status switching sub-unit, for selectively switching a control status of the target data according to the labels of the target data;

a backup sub-unit, for performing a backup mechanism on the target data according to the labels of the target data;

a remote control sub-unit, for performing a remote control mechanism on the target data according to the labels of the target data;

an error report sub-unit, for performing an error report mechanism on the target data according to the labels of the target data;

an error processing sub-unit, for performing a corresponding processing mechanism according to an error event indicated by the labels of the target data;

a flow monitoring sub-unit, for performing a flow monitoring mechanism on the target data;

a data retransmission sub-unit, for determining whether to initiate a data retransmission mechanism associated with a retransmission of the target data according to whether the target data is received within a reasonable time frame;

a transmission interrupt sub-unit, for determining whether to stop the initiated data retransmission mechanism according to a result from the initiated data retransmission mechanism;

a traffic abnormality processing sub-unit, for determining whether performing abnormality contingency mechanism according to whether the traffic of the target data surges in a time unit;

a status restoration sub-unit, for evaluating and confirming whether performing a data status restoration mechanism after an associated exception, error, interrupt, or traffic abnormality processing mechanism is performed; and a shortest path handling sub-unit, for determining a shortest path for scan according to the labels of the target data.

In an embodiment, the flow monitoring sub-unit may perform the flow monitoring mechanism on the target data according to the labels of the target data.

In an embodiment, the transmission interrupt sub-unit determines whether to stop the initiated data retransmission mechanism according to whether a result from the initiated data retransmission mechanism achieves an expected result.

In an embodiment, the flow monitoring sub-unit may perform the flow monitoring mechanism on the target data according to outputs of the error report sub-unit and the error processing sub-unit.

The present invention can use the data capture unit to process the target data, and assign a plurality of labels to the target data, so that the data processing control unit can perform processing with the corresponding process in subsequent control, in order to achieve a significant enhancement in the security of data transmission.

DETAILED DESCRIPTION OF THE INVENTION

Figure 1:
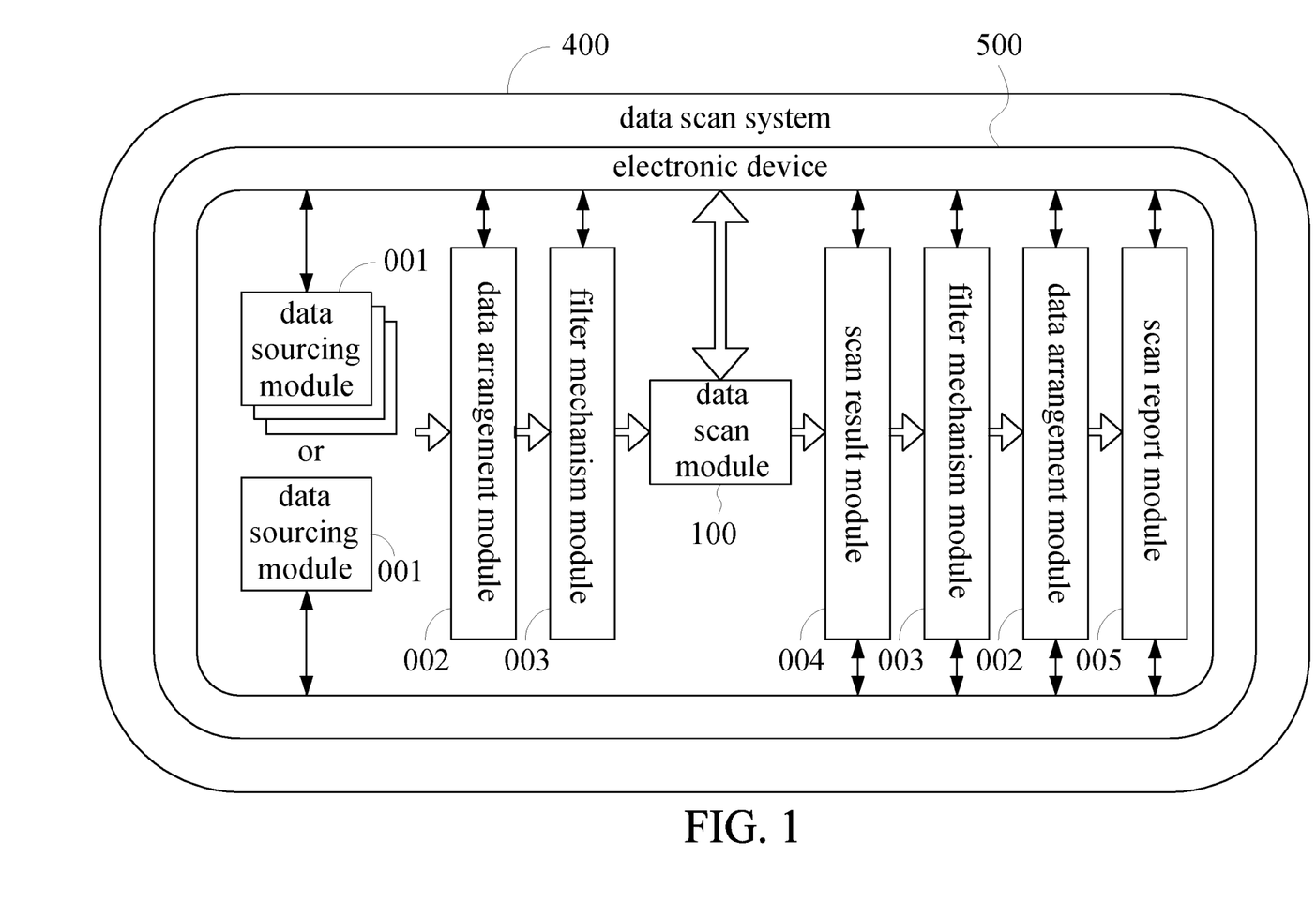
FIG. 1 is a schematic structural diagram of a preferred embodiment of a data scan system according to the present invention.

With regard to a preferred embodiment of the data scan system of the present invention, please refer to FIG. 1. The data scan system 400 includes an electronic device 500. The data scan system 400 can be a combination of a smart network interface card (NIC) and a programmable circuit, such as a field programmable gate Array (FPGA), or a software-based network facility, such as a software-defined network (SDN), or a virtualized network module, such as a network function virtualization (NFV). The electronic device 500 can be a cloud device, or a personal computer, or a stand-alone embedded system. The electronic device 500 includes a data scan module 100. Please refer to FIG. 2, the data scan module 100 includes a data capture unit 200 and a data processing control unit 300. The data processing control unit 300 and the data capture unit 200 are connected in series with each other.

Figure 2:
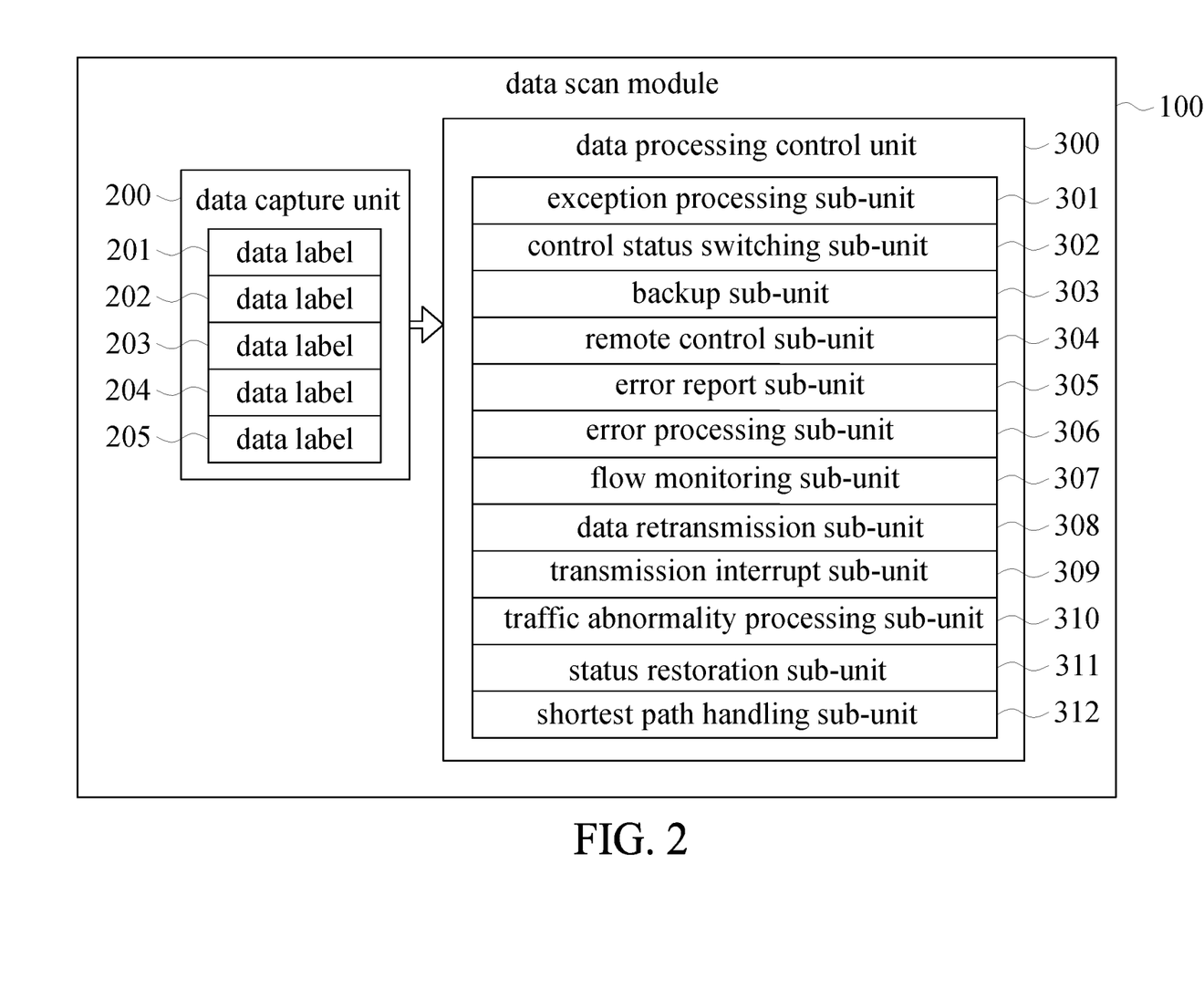
FIG. 2 is a schematic structural diagram of an embodiment of a data scan module according to the present invention.

The data capture unit 200 is used for capturing a target data, and the target data is then assigned with a plurality of corresponding labels by the data capture unit 200, wherein the plurality of labels includes multiple formats, such as text, numerical values, and digital data, etc., however, the present invention is not limited to the abovementioned exemplary formats. The plurality of labels may be a data label 201 indicating a digital form of the target data, a data label 202 indicating a description of content of the target data, a data label 203 indicating a hash value of the target data, a data label 204 indicating a source of the target data, and a data label 205 indicating an attribute of the target data.

The data processing control unit 300 includes an exception processing sub-unit 301 arranged for performing an exception processing mechanism on the target data according to the labels of the target data; a control status switching sub-unit 302 arranged for selectively switching a control status of the target data according to the labels of the target data; a backup sub-unit 303 arranged for performing a backup mechanism on the target data according to the labels of the target data; a remote control sub-unit 304 arranged for performing a remote control mechanism on the target data according to the labels of the target data; an error report sub-unit 305 arranged for performing an error report mechanism on the target data according to the labels of the target data; an error processing sub-unit 306 arranged for performing a corresponding processing mechanism according to an error event indicated by the labels of the target data; a flow monitoring sub-unit 307 arranged for performing a flow monitoring mechanism on the target data, for example, to monitor some suspicious paths according to the labels of the target data, or other approach, such as, according to an output of the error report sub-unit 305 that may show there is some tampered data and an output of the error processing sub-unit 306 that may indicate to detect where the root of malfunction, misbehavior, or disorder is; a data retransmission sub-unit 308 arranged for determining whether to initiate a data retransmission mechanism associated with a retransmission of the target data according to whether the target data is received within a reasonable time frame; a transmission interrupt sub-unit 309 arranged for determining whether to stop the initiated data retransmission mechanism according to the result from the initiated data retransmission mechanism, for example, according to whether the result from data retransmission mechanism can achieve its expected result, such as the situation that there is no chance to achieve its expected result due to an unusual packet error rate so that the initiated data retransmission should be stopped; a traffic abnormality processing sub-unit 310 arranged for determining whether performing abnormality contingency mechanism according to whether the traffic of the target data surges in a time unit; a status restoration sub-unit 311 arranged for evaluating and confirming whether performing a data status restoration mechanism after the associated exception, error, interrupt, or traffic abnormality processing mechanism is performed; and a shortest path handling sub-unit 312, arranged for determining a shortest path for scan according to the labels of the target data.

In the preferred embodiment, the data processing control unit 300 determines whether to trigger the corresponding processing mechanism by adapting to the labels of the target data from the data capture unit 200 in response to various complicated conditions in the processing. For example, when the attribute 205 of the target data indicates an error, the exception processing sub-unit 301 is triggered to perform an exception processing mechanism such that the target data will not be scanned in order to avoid unnecessary waste of resources. In another example, the control status switching sub-unit 302 can determine whether to switch the subsequent process to the shortest path handling sub-unit 312 according to the description of the target data indicated by the data label 202, the source of the target data indicated by the data label 204, and the attribute of the target data indicated by the data label 205. In yet another example, the shortest path handling sub-unit 312 can determine a shortest scan sequence for the target data according to the digital form of the target data indicated by the data label 201 and the description of the target data indicated by the data label 202. For example, the target data has at least four data sections, as indicated by A-B-A-B. However, due to the fact that the A-B data section is repeated, the shortest path handling sub-unit 312 may scan the first section A and the fourth section B. In another example, the shortest path handling sub-unit 312 can handle the target data by only scanning once for the repeated sections (in this case, A-B is the shortest path to be scanned) with regard to the effectiveness, critical characteristic, and sensitivity.

Please refer back to FIG. 1, in the embodiment, the electronic device 500 is explained by a personal computer, where the data scan module 100 can perform a data scan program thereon. As can be seen from FIG. 1, the electronic device 500 further includes a data sourcing module 001, a data arrangement module 002, a filter mechanism module 003, a scan result module 004 and a scan report module 005. The data arrangement module 002 is linked to the data sourcing module 001, the filter mechanism module 003 is linked to the data arrangement module 002, and the data scan module 100 is linked to the filter mechanism module 003. The data arrangement module 002 recombines the data sources into a data combination according to one or more data sources from the data sourcing module 001, and the data combination is provided to the filter mechanism module 003. The filter mechanism module 003 filters the data combination according to a filter mechanism in order to convert a raw data into the desired target data.

The data arrangement module 002 and the filter mechanism module 003 may also be treated as a data capturing module which is connected to other processing blocks (for example, the output of the data scan module 100, the scan result module 004 including a data processing control unit 300, and the scan report module 005, etc.), and the two are not limited to an arrangement order. The arrangement order can be flexibly changed according to different embodiments to improve the security of data transmission in response to various scenarios occurred in each stage of protection data scan.

Figure 3:
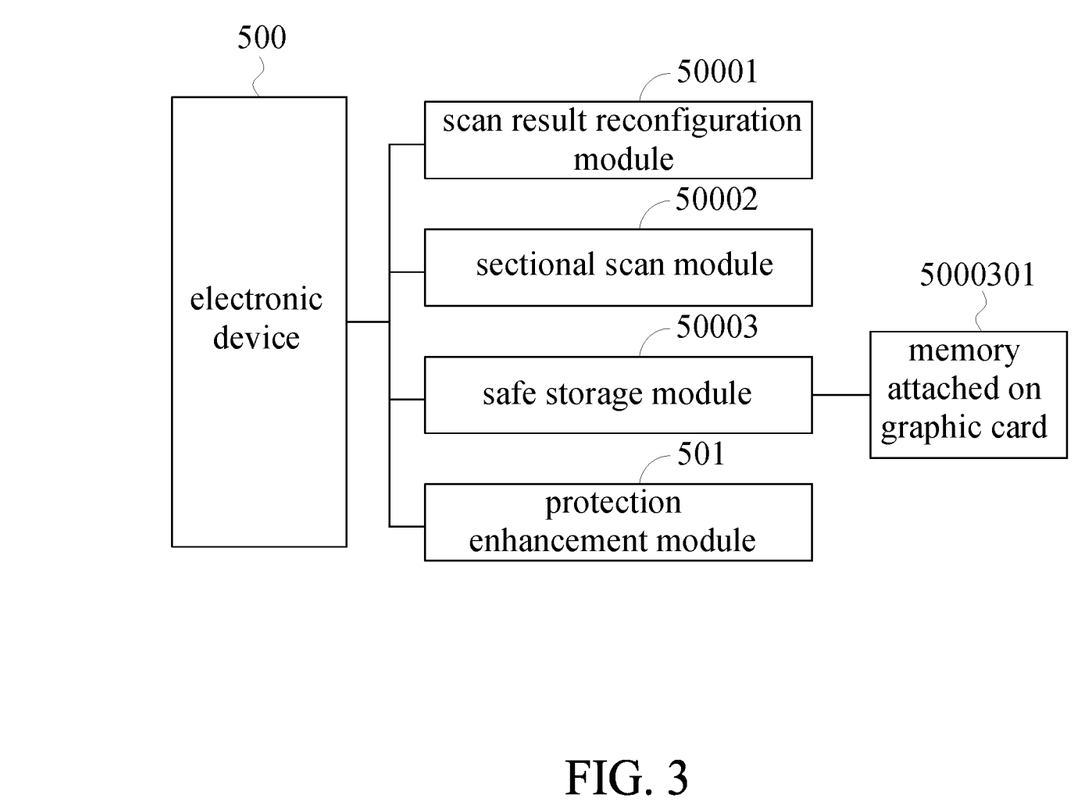
FIG. 3 is a schematic structural diagram of an embodiment of an electronic device according to the present invention.

Please refer to FIG. 3. As shown in FIG. 3, the electronic device 500 further includes a scan result reconfiguration module 50001, a sectional scan module 50002, a safe storage module 50003, and a protection enhancement module 501. The scan result reconfiguration module 50001 is configured to reconfigure the scan result of the target data. The sectional scan module 50002 scans the target data in a sectional manner. The safe storage module 50003 is used to store the scan result of the target data in a main memory, an external disk, or a storage device other than a magnetic tape. In a preferred example, the storage device can be a memory attached on a graphics card 5000301. In general, any storage device which is able to be removed easily and does not store data in a networking environment can be taken as the storage device in the above example.

Figure 4:
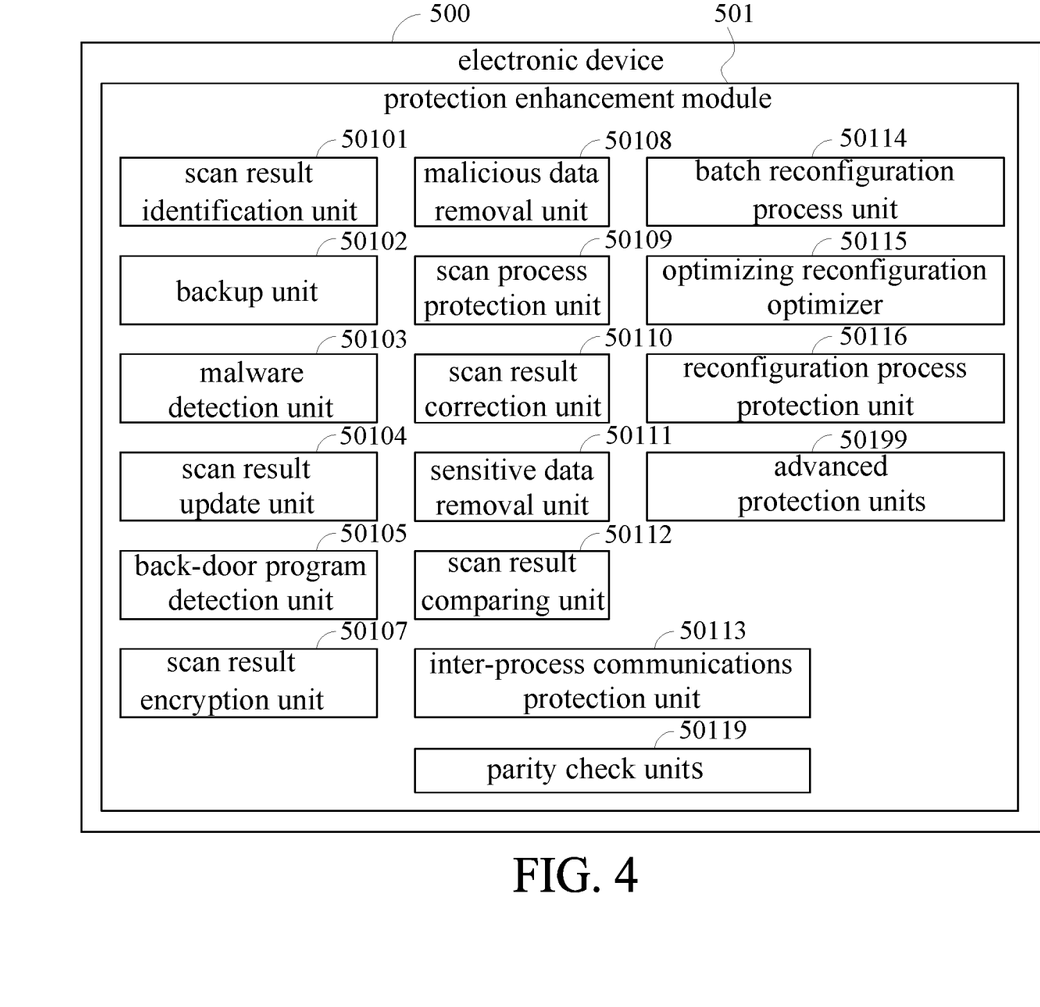
FIG. 4 is a schematic structural diagram of an embodiment of a protection enhancement module according to the present invention.

In the embodiment, please refer to FIG. 4, the protection enhancement module 501 can be a combination of 12 means depending on different needs, characteristics and environment, etc., in order to achieve the purpose of strengthening the protection of scan process. The protection enhancement module 501 may include a scan result identification unit 50101 arranged for identifying identical scan results; a backup unit 50102 arranged for providing a backup graphic card; a malware detection unit 50103 arranged for detecting a malware that infects the data scan system via an USB interface; a scan result update unit 50104 arranged for reusing the scan result; a back-door program detection unit 50105 arranged for detecting a back-door program installed in the data scan system; a scan result encryption unit 50107 arranged for encrypting the reconfigured scan result; a malicious data removal unit 50108 arranged for removing malicious data from the reconfigured scan result; a scan process protection unit 50109 arranged for protecting the scan process; a scan result correction unit 50110 arranged for correcting multiple scan results of the target data; a sensitive data removal unit 50111 arranged for removing particular sensitive data from a reconfigured scan result; a scan result comparing unit 50112 arranged for comparing the scan result to a corresponding known vulnerability; an inter-process communications protection unit 50113 arranged for protecting communications between scan processes; a batch reconfiguration process unit 50114 arranged for processing massive reconfigured scan results; a reconfiguration process optimizer 50115 arranged for preventing a reconfiguration process from affecting the performance of database; a reconfiguration process protection unit 50116 arranged for providing a safe scan result reconfiguration flow; and a parity check unit 50119 arranged for performing a parity check on a system memory, in order to improve the convenience and security of data gathering. In the preferred embodiment of the electronic device 500 as a personal computer, it can also be accompanied with means as using the solid-state drive, not using a CPU with a higher market share and/or using an UEFI instead of a BIOS to further enhance the protection.

Figure 5:
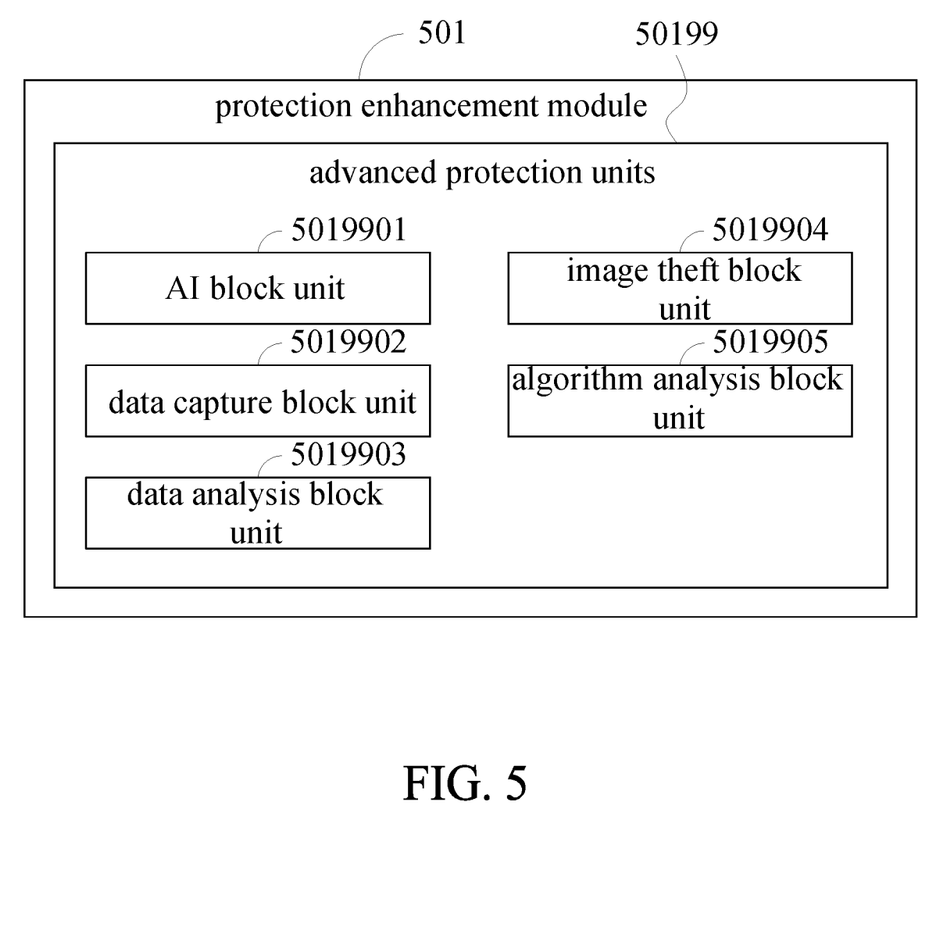
FIG. 5 is a schematic structural diagram of an embodiment of an advanced protection unit in the protection enhancement module according to the present invention.

Please refer to FIG. 5, in order to further perfect the protection scan process, the protection enhancement module 501 further includes advanced protection units 50199, for instance, an AI block unit 5019901 arranged for preventing an artificial intelligent hack; an image theft block unit 5019904 arranged for preventing a content in a GPU from being stolen by displaying images; an algorithm analysis block unit 5019905 arranged for preventing a map reduced algorithm from analyzing a scan report; a data capture block unit 5019902 arranged for preventing the generated scan report from being captured as training data for a neural network; and a data analysis block unit 5019903 arranged for preventing the generated report from being analyzed with a dissociation process such as Fourier Transform or any other similar dissociation methods that is capable of facilitating the detection of data regularity or similarity. Besides from the combination of 12 of the above units that provides enhanced protection mechanism, the invention further provides advanced protection mechanisms. That is, in addition to the combination of the enhanced protection mechanism used in FIG. 4, to select an advanced protection unit from FIG. 5 to process the generated scan report, in order to prevent the generated scan report from being exploited in advance.

Figure 6:
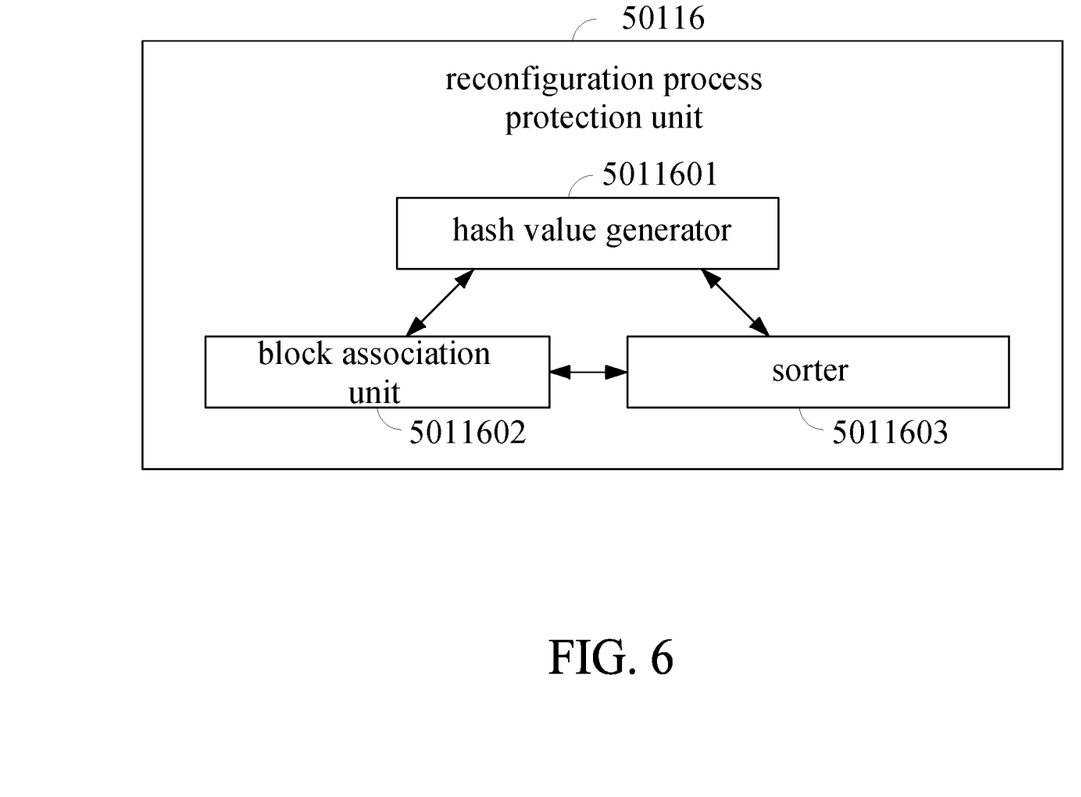
FIG. 6 is a schematic structural diagram of an embodiment of a reconfiguration process protection unit according to the present invention.

Please refer to FIG. 6, the reconfiguration process protection unit 50116 includes a hash value generator 5011601, a block association unit 5011602 and a sorter 5011603. The hash value generator 5011601 is arranged for generating a hash value corresponding to each of a plurality of data blocks scanned, respectively. The block association unit 5011602 is arranged for associating the plurality of data blocks according to the plurality of hash values. The sorter 5011603 is arranged for sorting the plurality of data blocks based on a dynamically determined sorting method. The present invention should include the above three processing steps to ensure its security, depending on the needs and environment, and the order of the steps can be adjusted without any dependencies (as shown in FIG. 6). In a preferred embodiment, the scan result can be split into different blocks, and the hash value generator 5011601 generates a hash value for each block, the block association unit 5011602 assigns an association between blocks, respectively, according to the dimensional information, and finally the sorter 5011603 performs different sorting methods to complete the reconfiguration.

Figure 7:
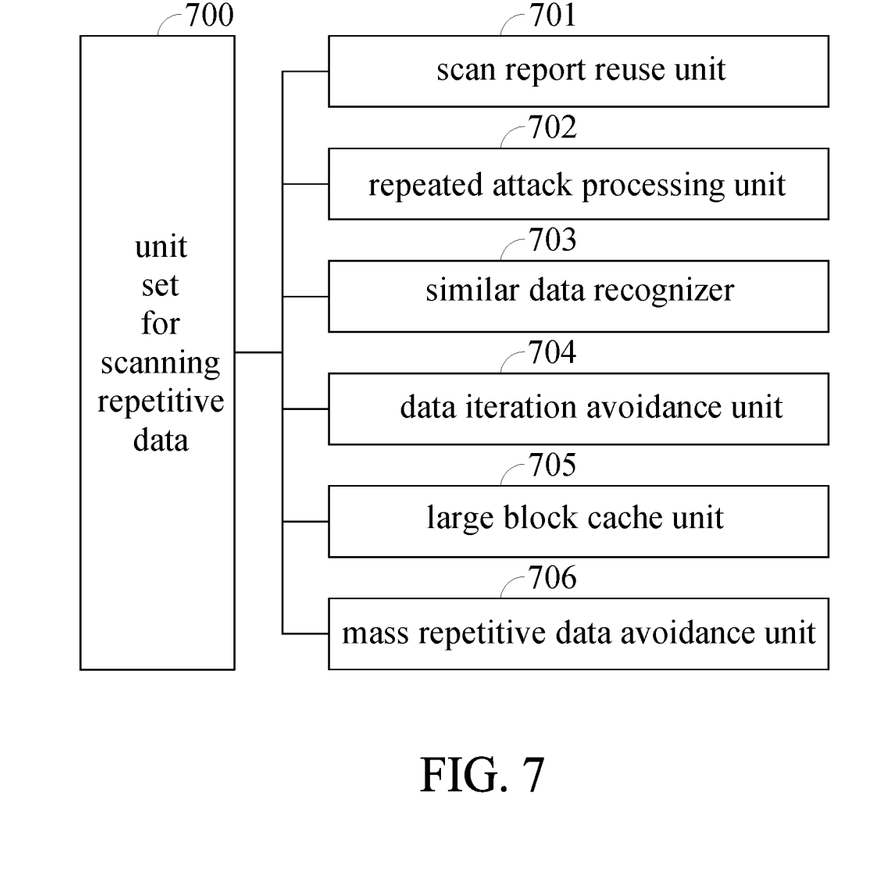
FIG. 7 is a schematic structural diagram of a strengthening portion of another embodiment of the data scan module of FIG. 2 according to the present invention.

Please refer to FIG. 7, the data scan module 100 further includes unit set for scanning repetitive data 700, to process repeated scan data of different types more efficiently, wherein the unit set includes a scan report reuse unit 701 arranged for processing and providing a corresponding scanned report, a repeated attack processing unit 702 arranged for processing a repeated attack data, so as to mitigate the risk of scan, a similar data recognizer 703 arranged for recognizing a similar data, in order to speed up the scan processes, a data iteration avoidance unit 704 built in with a iteration identification function and arranged for avoiding performing a complete scan on iterated data in order to efficiently scan data, a large block cache unit 705 arranged for caching a large block of same data to speed up the scan processes, and a mass repetitive data avoidance unit 706 arranged for avoiding rescanning repetitive data from a massive amount of devices to enhance scan efficiency.

Figure 8:
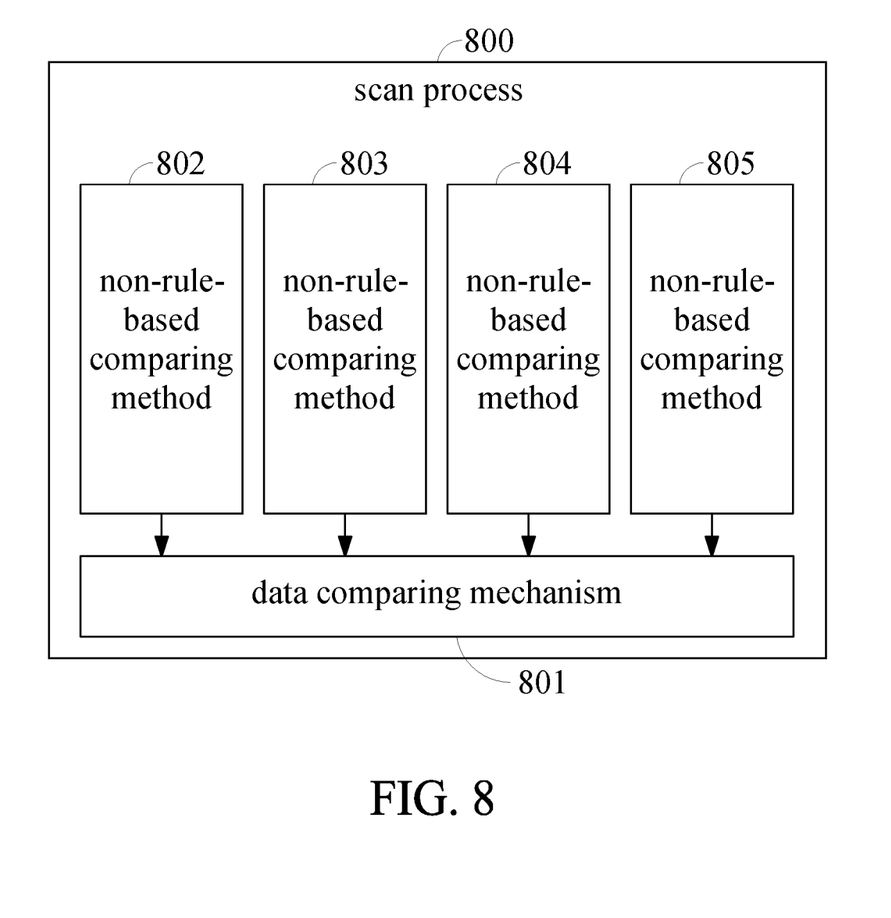
FIG. 8 is a schematic structural diagram of an embodiment of a scan result comparing unit according to the present invention.

Please refer to FIG. 8, in a preferred embodiment, the data comparing mechanism 801 of the scan process 800 of the scan result comparing unit 50112 is implemented with at least 4 non-rule-based comparing methods, for instance, with a non-rule-based comparing method 802, a non-rule-based comparing method 803, a non-rule-based comparing method 804, and a non-rule-based comparing method 805 to compare data, and is excluding any rule-based comparing method.

It will be understood by those skilled in the art that all or part of the steps of the method executed in the present invention can be completed by a computer program indicating a related hardware such as a computer device or a processor. The computer program can be stored in a transitory computer readable storage medium, and the computer program is executed to cause the steps of the auxiliary method of the present invention to be performed. Depending on the circumstances, any reference herein to a memory, storage, database, or other medium may include non-volatile and/or volatile memory. Examples of non-volatile memory include read only memory (ROM), programmable design ROM (PROM), electrically programmable design ROM (EPROM), electrically erasable programmable design ROM (EEPROM), flash memory, tape, floppy disk, magneto-optical data storage device, optical data storage device, hard disk, solid state disk, etc. Examples of volatile memory include random access memory (RAM), external cache memory, and the like.

The various technical features described above can be arbitrarily combined. Although not all possible combinations of these technical features are described, any combination of these technical features should be considered to be covered by this specification as long as there is no contradiction in such a combination.

While the present disclosure has been described by means of specific embodiments, numerous modifications and variations could be made thereto by those skilled in the art without departing from the scope and spirit of the present disclosure set forth in the claims.

What is claimed is:

1. A data scan system, comprising:
an electronic device, comprising a data scan module, wherein the data scan module comprises:
a data capture unit, for capturing target data, and assigning a plurality of corresponding labels to the target data that was captured by the data capture unit; and
a data processing control unit, linked with a data capturing module which is for data arrangement and filter mechanism, wherein the data processing control unit comprises:
an exception processing sub-unit, for performing an exception processing mechanism on the target data according to the plurality of corresponding labels of the target data;
a control status switching sub-unit, for selectively switching a control status of the target data according to labels corresponding to the target data for switching the control status;
a backup sub-unit, for performing a backup mechanism on the target data according to the plurality of corresponding labels of the target data;
a remote control sub-unit, for performing a remote control mechanism on the target data according to the plurality of corresponding labels of the target data;
an error report sub-unit, for performing an error report mechanism on the target data according to the plurality of corresponding labels of the target data;
an error processing sub-unit, for performing a corresponding processing mechanism according to an error event indicated by the plurality of corresponding labels of the target data;
a flow monitoring sub-unit, for performing a flow monitoring mechanism on the target data;
a data retransmission sub-unit, for determining whether to initiate a data retransmission mechanism associated with a retransmission of the target data according to whether the target data is received within a time frame;
a transmission interrupt sub-unit, for determining whether to stop the initiated data retransmission mechanism according to a result from the initiated data retransmission mechanism;
a traffic abnormality processing sub-unit, for determining whether performing abnormality contingency mechanism according to whether the traffic of the target data surges in a time unit;
a status restoration sub-unit, for evaluating and confirming whether performing a data status restoration mechanism after an associated exception, error, interrupt, or traffic abnormality processing mechanism is performed; and
a shortest path handling sub-unit, for determining a shortest path for scan according to the plurality of corresponding labels of the target data.

2. The data scan system of claim 1, wherein the flow monitoring sub-unit performs the flow monitoring mechanism on the target data according to the labels of the target data.

3. The data scan system of claim 2, wherein the transmission interrupt sub-unit determines whether to stop the initiated data retransmission mechanism according to whether the result from the initiated data retransmission mechanism can achieve an expected result.

4. The data scan system of claim 1, wherein the flow monitoring sub-unit performs the flow monitoring mechanism on the target data according to outputs of the error report sub-unit and the error processing sub-unit.

5. The data scan system of claim 1, wherein the plurality of labels comprising a digital form of the target data, a description of the target data, a hash value of the target data, a source of the target data, and an attribute of the target data.

6. The data scan system of claim 1, wherein the data scan system is a combination of smart network interface card (NIC) and array of programmable circuit, or a software defined network (SDN), or a network virtualization function (NFV).

7. The data scan system of claim 1, wherein the electronic device comprises a cloud device, a personal computer or an embedded system.

8. The data scan system of claim 1, wherein the electronic device further comprises:
a data sourcing module, comprising one or more data source;
a data arrangement module, linked with the data sourcing module; and
a filter mechanism module, linked with the data capture unit,
wherein the data arrangement module provides a data combination to the filter mechanism module according to one or more data source from the data sourcing module, and the filter mechanism module filters the data combination according to a filter mechanism to acquire a raw data as the captured target data.

9. The data scan system of claim 1, wherein the electronic device further comprises:
a scan result reconfiguration module, for reconfiguring a scan result of the target data;
a sectional scan module, for scanning the target data in a sectional manner; and
a safe storage module, for storing the scan result of the target data in a main memory, an external disk, or a storage device other than a magnetic tape.

10. The data scan system of claim 9, wherein the storage device is a memory device on a graphic card.

11. The data scan system of claim 9, wherein the electronic device further comprises:
a protection enhancement module, comprising at least 1 of:
a scan result identification unit, for identifying identical scan results;
a backup unit, for providing a backup graphic card;
a malware detection unit, for detecting a malware that infects the data scan system via an USB interface;
a scan result update unit, for reusing the scan result;
a back-door program detection unit, for detecting a back-door program installed in the data scan system;
a scan result encryption unit, for encrypting the reconfigured scan result;
a malicious data removal unit, for removing malicious data from the reconfigured scan result;
a scan process protection unit, for protecting the scan process;
a scan result correction unit, for correcting multiple scan results of the target data;
a sensitive data removal unit, for removing particular sensitive data from a reconfigured scan result;
a scan result comparing unit, comparing the scan result to a corresponding known vulnerability;
an inter-process communications protection unit, for protecting communications between scan processes;
a batch reconfiguration process unit, for processing massive reconfigured scan results;
a reconfiguration process optimizer, for preventing a reconfiguration process from affecting database performance;
a reconfiguration process protection unit, for providing a safe scan result reconfiguration flow; and
a parity check unit, for performing a parity check on a system memory.

12. The data scan system of claim 11, wherein the protection enhancement module further comprises:
an AI block unit, for preventing an artificial intelligent hack;
an image theft block unit, for preventing a content in a GPU from being stolen by displaying images;
an algorithm analysis block unit, for preventing a map reduced algorithm from analyzing a scan report;
a data capture block unit, for preventing the generated scan report from being captured as training data for a neural network; and
a data analysis block unit, for preventing the generated scan report from being analyzed with a dissociation process.

13. The data scan system of claim 12, wherein the dissociation process is Fourier Transform.

14. The data scan system of claim 11, wherein the reconfiguration process protection unit comprises:
a hash value generator, for generating a hash value corresponding to each of data blocks scanned, respectively;
a block association unit, for associating the data blocks according to the hash values; and
a sorter, for sorting the data blocks based on a dynamically determined sorting method.

15. The data scan system of claim 11, wherein the scan result comparing unit employs a combination of at least 4 of non-rule-based comparing methods, and excludes any rule-based comparing method.

16. The data scan system of claim 1, wherein the data scan module further comprises:
a scan report reuse unit, for reusing a scan report;
a repeated attack processing unit, for processing repeated attack data;
a similar data recognizer, for recognizing similar data;
a data iteration avoidance unit, for avoiding performing a complete scan on iterated data;
a large block cache unit, for caching a large block of same data; and
a mass repetitive data avoidance unit, for avoiding rescanning repetitive data from massive number of devices.

* * * * *